(12) United States Patent
Soled et al.

(10) Patent No.: US 7,605,107 B2
(45) Date of Patent: Oct. 20, 2009

(54) METHOD OF PREPARING A SUPPORTED HYDROTREATING CATALYST

(75) Inventors: Stuart L. Soled, Pittstown, NJ (US); Sabato Miseo, Pittstown, NJ (US); Joseph E. Baumgartner, Califon, NJ (US); Christine E. Kliewer, Clinton, NJ (US); Andrzej Malek, Baton Rouge, LA (US); Andrew C. Moreland, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 176 days.

(21) Appl. No.: 11/238,929

(22) Filed: Sep. 29, 2005

(65) Prior Publication Data

US 2007/0072765 A1    Mar. 29, 2007

(51) Int. Cl.
*B01J 31/00*     (2006.01)
*B01J 27/02*     (2006.01)
*B01J 21/00*     (2006.01)
*B01J 23/00*     (2006.01)

(52) U.S. Cl. .................. 502/216; 502/150; 502/255; 502/258; 502/259; 502/260; 502/313; 502/315

(58) Field of Classification Search .................. 502/216, 502/150, 255, 258–260, 313, 315
See application file for complete search history.

(56) References Cited

U.S. PATENT DOCUMENTS

| 2,650,906 | A | * | 9/1953 | Willem et. al. ............... 502/315 |
| 3,810,830 | A | * | 5/1974 | van Klinken et al. ... 208/111.15 |
| 4,530,911 | A | * | 7/1985 | Ryan et al. .................... 502/74 |
| 4,540,483 | A | * | 9/1985 | Simpson et al. ........ 208/216 PP |
| 5,001,101 | A | * | 3/1991 | Kemp .......................... 502/211 |
| 2004/0011705 | A1 | * | 1/2004 | Drake et al. ................. 208/213 |
| 2006/0149097 | A1 | * | 7/2006 | Soled et al. .................. 562/487 |

FOREIGN PATENT DOCUMENTS

WO    WO 2004046076 A2  *  6/2004

\* cited by examiner

*Primary Examiner*—Patricia L Hailey

(57) ABSTRACT

This invention relates to supported multi-metallic catalysts for use in the hydroprocessing of hydrocarbon feeds, as well as a method for preparing such catalysts. The catalysts are prepared from a catalyst precursor comprised of at least one Group VIII metal and a Group VI metal and an organic agent selected from the group consisting of amino alcohols and amino acids. The catalyst precursor is thermally treated to partially decompose the organic agent, then sulfided.

17 Claims, 11 Drawing Sheets

23630-106A

23630-108A

21649-138

METHOD OF PREPARING A SUPPORTED HYDROTREATING CATALYST

FIELD OF THE INVENTION

This invention relates to supported multi-metallic catalysts for use in the hydroprocessing of hydrocarbon feeds, as well as a method for preparing such catalysts. The catalysts are prepared from a catalyst precursor comprised of at least one Group VIII metal and a Group VI metal and an organic agent selected from the group consisting of amino alcohols and amino acids. The catalyst precursor is thermally treated to partially decompose the organic agent, then sulfided.

BACKGROUND OF THE INVENTION

Environmental and regulatory initiatives are requiring ever-lower levels of both sulfur and aromatics in distillate fuels. For example, proposed sulfur limits for distillate fuels to be marketed in the European Union for the year 2005 is 50 wppm or less. There are also regulations that will require lower levels of total aromatics in hydrocarbons and, more specifically, to lower levels of multi-ring aromatics found in distillate fuels and heavier hydrocarbon products. Further, the maximum allowable aromatics level for U.S. on-road diesel, CARB reference diesel, and Swedish Class I diesel are 35, 10 and 5 vol. %, respectively. Further, the CARB and Swedish Class I diesel fuel regulations allow no more than 1.4 and 0.02 vol. % polyaromatics, respectively. Consequently, much work is presently being done in the hydrotreating art because of these proposed regulations.

Hydrotreating, or in the case of sulfur removal, hydrodesulfurization, is well known in the art and typically requires treating the petroleum streams with hydrogen in the presence of a supported catalyst at hydrotreating conditions. The catalyst is usually comprised of a Group VI metal with one or more Group VIII metals as promoters on a refractory support, such as alumina. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization. Nickel promoted molybdenum on alumina catalysts are the most widely used for hydrodenitrogenation, partial aromatic saturation, as well as hydrodesulfurization.

The ability to modify the nanostructural morphology of supported hydrotreating catalysts provides a possible way to control their activity and selectivity. One of the important thrusts in hydrotreating catalyst research has been the realization over the last few years that a key synthesis tool for modifying nanostructure involves the incorporation of carbon into the sulfide structure. For example, U.S. Pat. No. 4,528,089 teaches that the use of carbon-containing catalyst precursors gave more active catalysts than catalysts prepared from sulfide precursors without organic groups. Use of organic impregnation aids in preparing oxide catalyst precursors has also been studied for some time (Kotter, M.; Riekeft, L.; Weyland, F.; *Studies in Surface Science and Catalysis* (1983), 16 (Prep. Catal. 3), 521-30 and U.S. Pat. No. 3,975,302.

While such catalysts have proven to be superior to more conventional hydrotreating catalysts, there still remains a need in the art for ever-more reactive and effective catalysts for removing heteroatoms, such as nitrogen and sulfur from hydrocarbon streams.

SUMMARY OF THE INVENTION

In an embodiment, there is provided a method for preparing a catalyst composition, which method comprises:

(a) impregnating an inorganic catalyst support with an aqueous solution containing (i) a salt of a Group VIII metal selected from Co and Ni, (ii) a salt of a Group VI metal selected from Mo and W, and (iii) an effective amount of an organic agent selected from amino alcohols and amino acids;

(b) drying said impregnated catalyst support to remove substantially all water, thereby resulting in a metal-organic on support catalyst precursor;

(c) calcining said substantially dried catalyst precursor in the presence of an oxygen-containing atmosphere at effective conditions to result in only oxidizing at least 30%, but not all, of said organic portion of said metal-organic component, thereby resulting in partially oxidized catalyst precursor;

(d) sulfiding said partially oxidized catalyst precursor at sulfiding conditions in the presence of a sulfiding agent, thereby resulting in a sulfided catalyst composition.

In another embodiment, the Group VIII metal is Co and the Group VI metal is Mo.

DETAILED DESCRIPTION OF THE INVENTION

Figure 1:
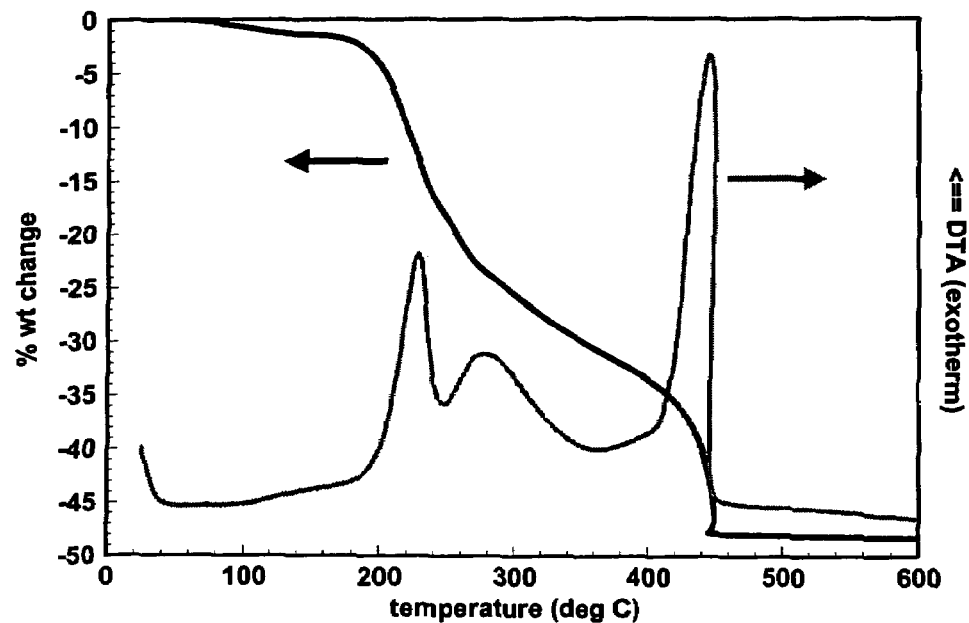
FIG. 1 hereof is the thermal gravimetry/diffential thermal analysis (TG/DTA) plot for the catalyst composition of Example 1 after impregnation with the catalytic metals and organic agent and drying step.

The catalysts of the present invention will contain at least one Group VIII metal and at least one Group VI metal. The preferred Group VIII metal will be selected from the non-noble metals iron, cobalt, and nickel and the noble metals platinum, palladium, ruthenium, and iridium. More preferred are the non-noble metals, and most preferred are cobalt and nickel. The Group VI metal is selected from molybdenum and tungsten, preferably molybdenum. It is preferred that the catalyst of the present invention be comprised of one Group VIII metal, preferably cobalt and one Group VI metal, preferably molybdenum. The Group VIII metal, in terms of its oxide form, is typically present in an amount ranging from about 2 to 20 wt. %, preferably from about 4 to 12%. The Group VI metal, also in terms of its oxide, will typically be present in an amount ranging from about 5 to 50 wt. %, preferably from about 10 to 40 wt. %, and more preferably from about 20 to 30 wt. %. All weight percents are based on the total weight of the catalyst.

Suitable support materials for the catalysts of the present invention include inorganic refractory materials such as alumina, silica, silicon carbide, amorphous and crystalline silica-aluminas, silica-magnesias, aluminophosphates boria, titania, zirconia, and mixtures and cogels thereof. Preferred supports include silica, alumina, alumina-silica and the crystalline silica-aluminas, particularly those materials classified as clays or zeolitic materials. The more preferred support materials for purposes of the present invention are alumina, silica, and alumina-silica, with alumina and silica being the most preferred.

The catalytic metals may be loaded onto the support by any suitable conventional techniques known in the art. Such techniques include impregnation by incipient wetness, by adsorption from excess impregnating medium, and by ion exchange. Preferred is incipient wetness. The metal-bearing catalysts of the present invention are typically dried, calcined, and sulfided. As previously mentioned, it is preferred to first prepare a catalyst precursor composition. The catalyst precursor of the present invention is prepared by use of an organic agent. Organic agents suitable for use in the practice of the present invention include the amino alcohols and amino acids. Non-limiting examples of suitable amino acids include natural and synthetic amino acids. The natural amino acids include all isomers of the following: alanine, arginine, asparagines, aspartic acid, cysteine, cystine, 3,5-dibromotyrosine, 3,5, diiodotyrosine, glutamic acid, glutamine, glycine, histidine, hydroxylysine, hydroxyproline, isoleucine, leucine, lysine, methionine, phenylalanine, proline, serine, threonine, thyroxine, tryptophane, tyrosine and valine, a particularly preferred amino acid is arginine.

Any suitable amino alcohols for use in the practice of the present invention. Particularly preferred hydoxyalkyl group containing nitrogen compounds include the mon-, di-, and tri-, substituted aliphatic hydroxyalkylamines such as methanolamine, di-methanolamine, tri-methanolamine, ethanolamine, di-ethanolamine, triethanolamine, butanolamine, dibutanolamine, tri-butanolamine, propanolamine, di-propanaolamine, and tri-propanolamine. Also preferred are N,N,-dialkyl-ethanolamines, N-alkyl-diethanolamines, N-alkyl-ethanolamines, N,N,-dialkyl-methanolamines, N-alkyl-dimethanolamines, N-alkyl-methanolamines and equivalent propanolamines, butanolamines, hexanolamines and heptanolamines. More preferred is triethanolamine. In these alkanolamines the N-alkyl group may be a hydrocarbon or substituted hydrocarbon group containing from 1 to 50 carbon atoms, preferably 1 to 8 carbon atoms and most preferably 1 to 4 carbons atoms such as methyl, ethyl, n-propyl, isopropyl, n-butyl, isobutyl, n-pentyl, isopentyl, n-hexyl, isohexyl, etc.

Examples of dialkylamino groups include $C_3$-$C_{50}$-dialkylaminoalkyl, preferably $C_3$-$C_{20}$-dialkylaminoalkyl, and more preferably $C_3$-$C_{10}$-dialkylaminoalkyl such as dimethylaminomethyl, dimethylaminoethyl, diethylaminoethyl, di-n-propylaminoethyl and diisopropylaminoethyl, preferably triethanolamine.

The organic agent and Group VIII and Group VI metals can be incorporated into the support material to produce a catalyst precursor in either two separate steps, or in a single step wherein both metals are co-precipitated onto the support along with the organic agent. For example, in a two-step process, the catalyst precursor can be prepared by impregnating a catalyst support with a first aqueous solution comprised of an effective amount of organic agent and a water soluble salt of either the Group VIII metal or the Group VI metal, in such concentration that will provide the resulting catalyst precursor with the desired amount of the metal. The impregnated support is then dried by conventional drying techniques, preferably at a temperature of about 100° C. until substantially all water is driven off. This time will typically range from about 2 to about 6 hours. The dried impregnated support, which now contains a metal-organic component is then oxidized. That is, the dried impregnated support is heated from drying temperatures to about 250° C. to about 325° C., preferably from about 275° C. to about 300° C. by increasing the temperature to calcination conditions stepwise, in the presence of an oxidizing gas to a degree wherein only partial oxidation, or decomposition, of the organic portion of the metal-organic component results. By partial oxidation, or decomposition, we mean that at least 20 wt. % but not all of the organic component is decomposed. Preferably from about 30 to about 90 wt. %, and more preferably from about 30 to about 75 wt. % of the organic component will be decomposed. At least a portion of the resulting partially formed catalyst precursor is impregnated a second time with an aqueous solution containing an effective amount of an organic agent and an effective amount of a water soluble salt of the remaining metal not impregnated during the first impregnation. For example, if a Group VIII metal was impregnated on the support during the first impregnation, then the Group VI metal will be impregnated onto the same support in this second impregnation. The partially formed catalyst precursor, now containing the second metal-organic component, is then subjected to drying to drive off substantially all of the water. The dried partial catalyst precursor is then oxidized stepwise to also partially oxidize the organic portion of the second metal-organic component, thus resulting in the final catalyst precursor comprised of the desired amounts of Group VIII and Group VI metals and organic residue, or remnant on a support.

Another method for preparing the catalyst precursor of the present invention is to co-impregnate both the Group VIII metal and the Group VI metal, along with the organic agent in a single impregnation step. The resulting co-impregnated support will then be dried to drive off substantially all of the water and oxidized, by calcination, to a degree wherein only a portion of the organic component will be decomposed, thus forming a final catalyst precursor. By only a portion we mean from about 20 wt. % to about 80 wt. % is decomposed. Thus, the decomposition steps can be easily separated.

The catalyst precursor of the present invention is converted to the resulting catalyst by sulfiding using conventional sulfiding techniques. This sulfiding may be accomplished in situ, namely in the reactor. For example, the catalyst can be brought into contact with a sulfur-containing feed in the presence of about 50 to about 1,500 V/H/V of a hydrogen-containing gas under conditions including a temperature of about 75° C. to about 450° C., a pressure (total pressure) of about 10 to about 2500 psig, and a liquid hourly space velocity of about 0.3 to about 2.0 V/H/V. After this sulfiding treatment, the sulfur-containing stream is switched over to the feedstock to be treated, and the operation is restarted under operation conditions suitable for hydrotreating of the feedstock. Alternative sulfiding treatments include either bringing the catalyst into direct contact with hydrogen sulfide or other sulfur compounds, or by adding the sulfur compound to a suitable feedstream, such as a distillate stream, and bringing the resulting distillate into contact with the catalyst. Suitable sulfur compounds, or sulfiding agents, which may be in the sulfur containing distillate include dimethyl disulfide, butyl mercaptan, dimethyl mercaptan, carbon disulfide, and the like.

Process conditions applicable for the use of the catalysts described herein may vary widely depending on the feedstock to be treated. Thus, as the boiling point of the feed increases, the severity of the conditions will also increase. The following table serves to illustrate typical conditions for a range of feeds.

TABLE

| FEED | TYPICAL BOILING RANGE ° C. | TEMP ° C. | PRESS, BARS | SPACE VELOCITY V/V/HR | $H_2$ GAS RATE SCF/B |
| --- | --- | --- | --- | --- | --- |
| Naphtha | 25-210 | 100-370 | 10-60 | 0.5-10 | 100-2,000 |
| Diesel | 170-350 | 200-400 | 15-110 | 0.5-4 | 500-6,000 |
| Heavy Gas Oil | 325-475 | 260-430 | 15-170 | 0.3-2 | 1000-6,000 |
| Lube Oil | 290-550 | 200-450 | 6-210 | 0.2-5 | 100-10,000 |
| Residuum | 10-50%>575 | 340-450 | 65-1100 | 0.1-1 | 2,000-10,000 |

Reaction pressures and hydrogen circulation rates below these ranges can result in higher catalyst deactivation rates resulting in less effective selective hydrotreating. Excessively high reaction pressures increase energy and equipment costs and provide diminishing marginal benefits.

The instant invention can be practiced in one or more stages or zones. In one preferred multistage process, a distillate boiling-range feedstock containing relatively high levels of sulfur and nitrogen is fed to a first hydrodesulfurization reaction stage to remove a substantial amount of the sulfur and nitrogen. Suitable feeds are those containing in excess of about 3,000 wppm sulfur and are typically raw virgin distillates.

The product stream is passed to a separation zone wherein a vapor phase product stream and a liquid phase product stream are separated. The liquid phase product stream is then passed to a second hydrodesulfurization stage, which also contains one or more reaction zones, where it is further hydrodesulfurized in the presence of hydrogen and a second hydrodesulfurization catalyst, which may or may not be the same catalyst as that of the first hydrodesulfurization stage. This will typically result in a treated stream containing from about 50 to about 600 wppm sulfur. It is preferred that the product stream from the second hydrodesulfurization stage contain less than about 150 wppm sulfur, more preferably less than about 100 wppm sulfur, and most preferably less than about 50 wppm sulfur. This twice hydrodesulfurized stream can be passed to a third reaction stage and reacted in the presence of hydrogen and a catalyst capable of further reducing the sulfur level and hydrogenating aromatics. The sulfur level of the final product stream will be less than about 10 wppm, preferably less than about 5 wppm, and more preferably less than about 1 wppm sulfur. It is within the scope of this invention that at least a portion of the vapor product stream from either or both reaction stages can be recycled to the first reaction stage.

No particular limitation is imposed on the feedstream to be subjected to hydrotreatment. Preferred feedstreams include distillates and residual oils from atmospheric and vacuum distillation processes, cracked gas oil fractions, and mixtures thereof. However, particularly preferred feedstreams are vacuum gas oil fractions cracked gas oils, straight-run gas oils and the like, which are typically difficult to achieve desulfurization and denitrogenation at the same time. Vacuum gas oil is a distillate that is obtained by subjecting atmospheric residual oil to vacuum distillation and has a boiling point in a range of from about 370° C. to about 610° C. It usually contains significant levels of sulfur, nitrogen and metals. For example, a vacuum gas oil such as Arabian crude oil has a sulfur content of from about 2 to about 4 wt. % and nitrogen content of from about 0.03 to about 0.2 wt. %. In addition, it also has a Conradson carbon residue of about 1 wt. % or so. Cracked gas oil is a cracked oil, which is obtained by thermal cracking of a residual oil and generally has a boiling point of about 200° C. or higher. It is available, for example, from a coker, visbreaker or the like of a residual oil. In addition, light cycle gas oil (LCGO), heavy cycle gas oil (HCGO) and the like, which are available from catalytic cracking plants, can also be subjected to the hydrotreating process of the present invention. According to the hydrotreating process of the present invention, the above-described hydrodesulfurization and hydro-denitrogenation of vacuum gas oil can be conducted most effectively.

The hydrotreating catalyst of the present invention can be used in any one of fixed-bed, fluidized-bed and moving-bed reaction systems. Adoption of a fixed bed is, however, preferred from the apparatus or operation standpoint. Further, it is also possible to achieve high desulfurization and denitrogenation levels by conducting hydrotreatment in plural, that is, two or more reactors connected together.

The following examples will serve to illustrate, but not limit, this invention.

EXAMPLES

I. Preparation and Characterization of Co—Mo/$SiO_2$ Hydrotreating Catalysts by the Method of this Invention A. Cobalt (Co) Impregnated First Example 1

Preparation of 7.9 wt. % CoO on Silica

Figure 2:
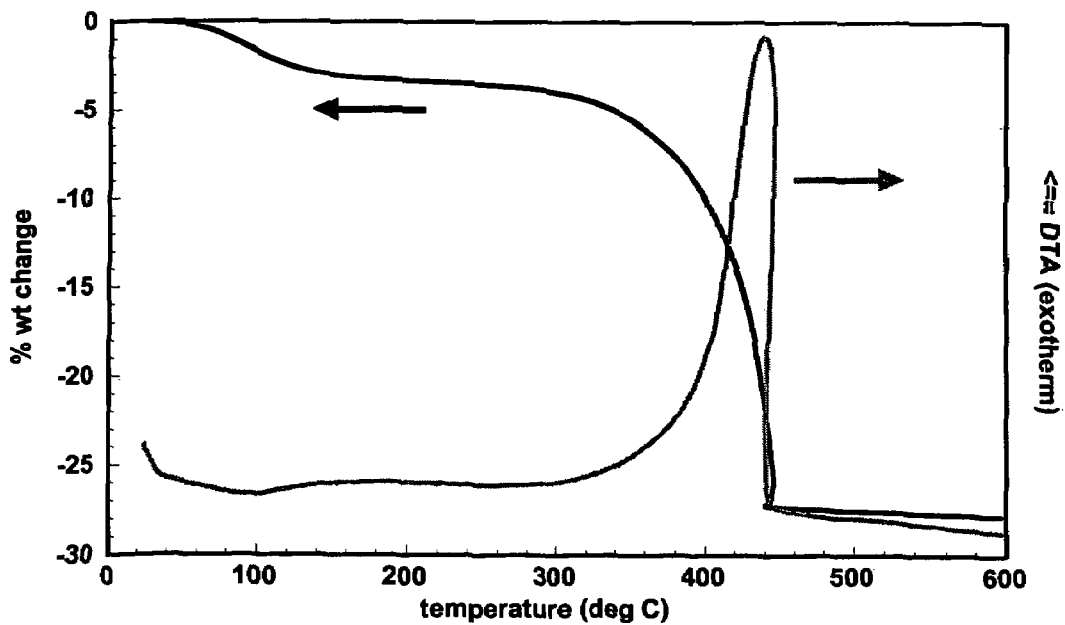
FIG. 2 hereof is the thermal gravimetry/diffential thermal analysis (TG/DTA) plot for a portion of the catalyst composition of used for FIG. 1 hereof, but which was subjected to a heat treatment at 0.5° C./minute to 275° C.

In the first step of preparing a 6% CoO-24% $MoO_3$ on $SiO_2$ catalyst, a sample of nominal composition 7.9 wt. % CoO on silica was prepared by creating as follows: 21 cc of an aqueous solution containing 6.14 grams of cobalt nitrate (Aldrich) and 17.42 grams of arginine (Aldrich) was heated to about 55° C. (pH about 10.9), then was impregnated onto 18.42 grams of silica, such that the molar ratio of arginine/Co was about 5/1. The sample was dried at 100° C. for four hours. FIG. 1 hereof shows the simultaneous TG/DTA (thermal gravimetry/differential thermal analysis) plot of the dried sample. It shows a multi-step decomposition pattern where it can be seen there are three discrete and separable exothermic decomposition steps below about 300° C., in which the cobalt-arginine complex is partially decomposed. A separate portion of the dried sample was then heated in a box furnace at 0.5 deg/min to 275° C. to generate a residual or remnant composition. FIG. 2 hereof shows how this remnant composition decomposes when heated in air indicating its stability to temperatues of about 350° C. A TG/MS spectra collected during the remnant decomposition in air (not shown) showed the evolution of $CO_2$, $H_2O$ and $NO_2$ indicating that this remnant contains C, H and N. IR measurements confirmed the presence of organic 0 species as well the presence of probable nitrile groups. Consequently, by heating to intermediate temperatures (about 275° C.-300° C.) the Co arginine precursor was converted to a strongly interacting partially decomposed cobalt-oxo-organic complex.

Example 2

Preparation of 6% CoO-24% $MoO_3$ on Silica (Sequential Preparation with Co Remnant Formed First, then Impregnated with Arginine in Mo Solution.)

7.6 grams of the 275° C. calcined material of Example 1 was impregnated by incipient wetness with an aqueous solution of 7 cc containing 2.9 grams of ammonium heptmolybdate (Aldrich) containing 2.9 grams arginine (arginine/Mo mole ratio 1:1) [pH8.2] and heated to about 55° C. and was dried at 100° C. for 4 hours. This sample was then heated in air at 0.5 deg/min and held at 250° C. for 4 hours. This remnant complex was then sulfided to form the supported sulfided catalyst as described below.

Figure 3:
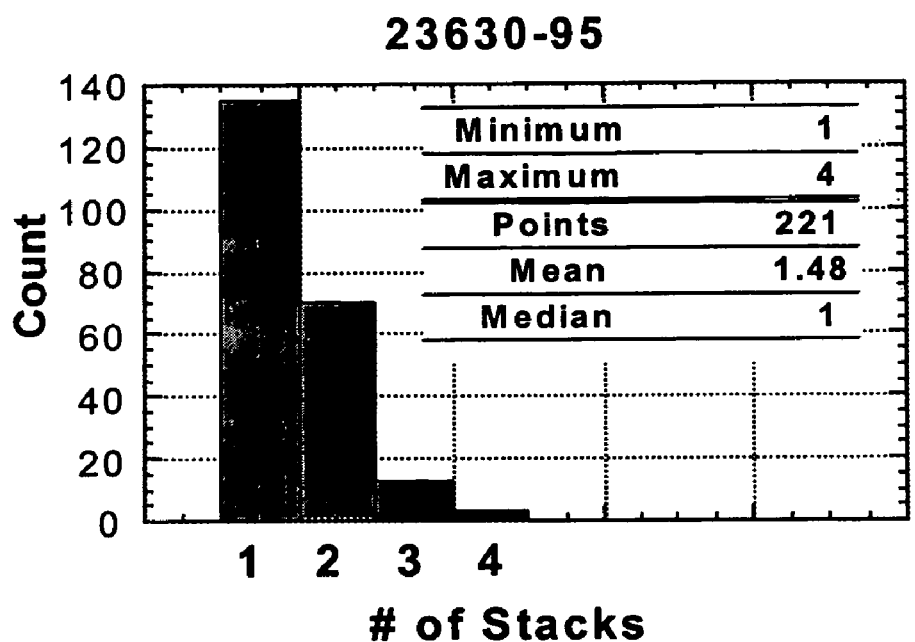
FIG. 3 is a histogram of the $MoS_2$ platelet stacks showing the statistical stack height measurement for the catalyst of Example 2.

A portion (1.5 to 2 grams) of the remnant complex was placed in a quartz boat, which was then inserted into a horizontal quartz tube and placed into a Lindberg furnace. While still at room temperature, a flow of 200 cc/min 10% $H_2S/H_2$ was admitted for 15 minutes, and then the temperature was raised to 400° C. in 45 minutes with the 10% $H_2S/H_2$ flowing at 200 cc/min. This flow was continued for 2 hours at 400° C. The heat was then shut off and the catalyst cooled in flowing $H_2S/H_2$ to room temperature and held at room temperature for 30 minutes at the same flow. Then 300 cc/min of $N_2$ was admitted for 30 minutes. After that, a 1% $O_2$ in He passivation gas was admitted at room temperature and flowed at 50 cc/min overnight. The sample was then removed from the furnace. A portion was sent for sulfur analysis and another small portion of the catalysts was examined by transmission electron microscopy (TEM). For this measurement, samples of the sulfided catalysts were crushed into pieces (less than 100 nm thick), dusted onto holey-carbon coated TEM grids, and examined in a bright field TEM imaging mode of a Philips CM200F instrument. 250-350 different crystals of the sulfided precursor were examined. It is known in the art that $MoS_2$ and $WS_2$ form two-dimensional layer structures, with sheets of Mo(W)$S_2$ separated from each other by Van der Waals forces. From electron microscopy, we can measure the number of sulfide sheets in the catalyst. FIG. 3 hereof is a histogram of $MoS_2$ platelet stacks showing the statistical stack height measurement for this catalyst. This catalyst sample, which has both the Co and Mo impregnated with amino acids precursors and with partial decomposition to form the remnant phase, has a mean (low) stack height measuring 1.48.

Example 3

Preparation of 6 wt. % CoO-24 wt. % $MoO_3$ on Silica (Sequential Preparation with Co Remnant Formed First, then Impregnated with Aqueous Mo Solution.)

Figure 4:
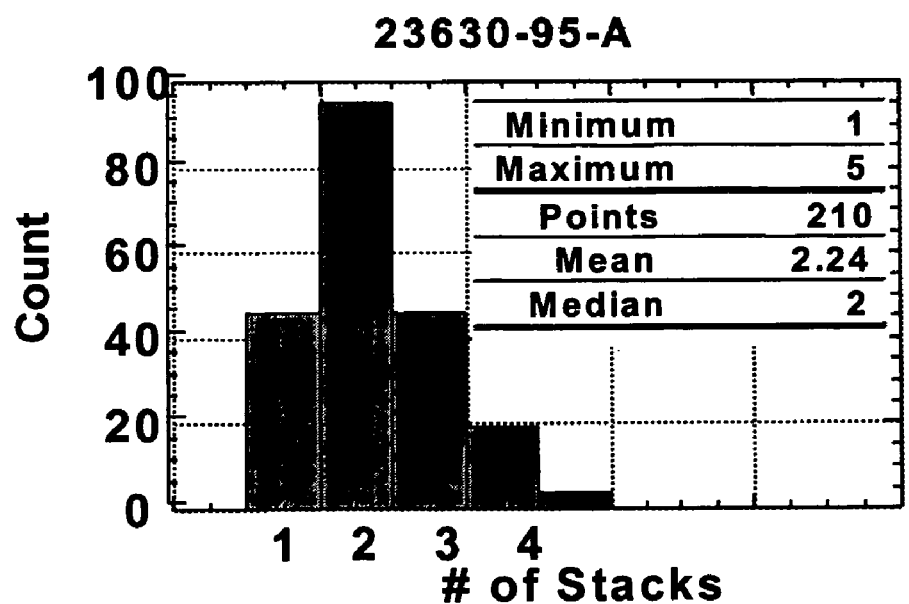
FIG. 4 is a histogram of the $MoS_2$ platelet stacks showing the statistical stack height measurement for the catalyst of Example 3.

A sample entirely analogous to that in Example 2 hereof is prepared except that the ammonium heptamolybdate impregnation solution is entirely aqueous with no organic added. This sample was also dried at 100° C. for four hours, then calcined at 250° C. for four hours. A portion of the sample was treated in an $H_2/H_2S$ mixture as described in Example 2 hereof and examined by TEM. This catalyst sample, which has the Co formed as a remnant but the Mo added aqueously, had a mean stack height increased to 2.24 (FIG. 4).

B. Co—Mo/SiO$_2$ with MoO$_3$ Impregnated First

Example 4

Preparation of 25.5 wt. % MoO$_3$ on Silica

Figure 5:
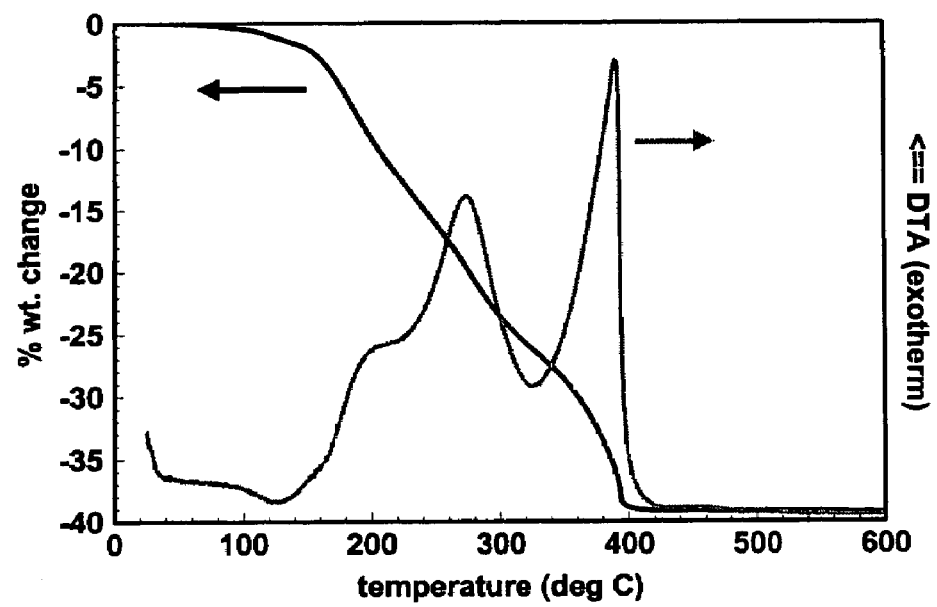
FIG. 5 is the thermal gravimetry/diffential thermal analysis (TG/DTA) plot showing the results of the multi-step decomposition of the catalyst composition of Example 4 after impregnation with catalytic metals and organic agent and drying.
Figure 6:
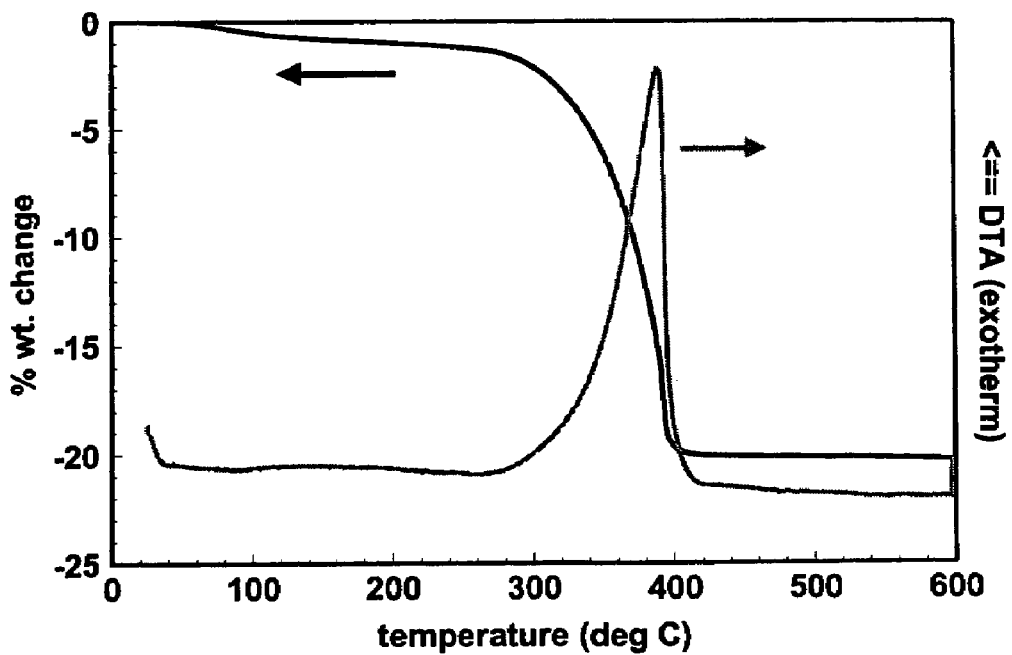
FIG. 6 is the thermal gravimetry/diffential thermal analysis (TG/DTA) plot for the catalyst composition of Example 1 after impregnation with the catalytic metals and organic agent, the drying step, and heating to 275° C. at a rate of 0.5° C./minute.

In the first step of preparing a 6 wt. % CoO-24 wt. % MoO$_3$ on SiO$_2$ catalyst, a sample of nominal composition 25.5 wt. % MoO$_3$ on silica was prepared by creating a molybdenum remnant as follows. To 14.9 grams of silica, an impregnation of 20 cc of an aqueous solution at about 55° C. containing 6.26 grams of ammonium heptamolybdate (Aldrich) and 15.4 grams of arginine (Aldrich) [pH about 9.3] was carried out, such that the molar ratio of arginine/Mo was about 2.5/1. The sample was dried at 100° C. for four hours. The multi-step decomposition pattern of this sample is shown in FIG. 5 hereof. During the exothermic decomposition steps below 275° C. to 300° C., the molybdenum-arginine complex was partially decomposed. A separate portion of the dried sample was then heated in a box furnace at 0.5°/min to 275° C. to generate the molybdenum-arginine residual or remnant composition. FIG. 6 hereof shows the TG of this remnant composition illustrating how it would decompose when heated in air. This indicates its stability to temperatures of about 350° C. Consequently, by heating to intermediate temperatures (about 275° C. to 300° C.) the Mo-arginine precursor is converted to a strongly interacting partially decomposed molybdenum-oxo-organic complex.

Example 5

Preparation of 6% CoO-24% MoO$_3$ on Silica (Sequential Preparation with Mo Remnant Formed First, then Impregnated with Arginine in Co Solution.)

Figure 7:
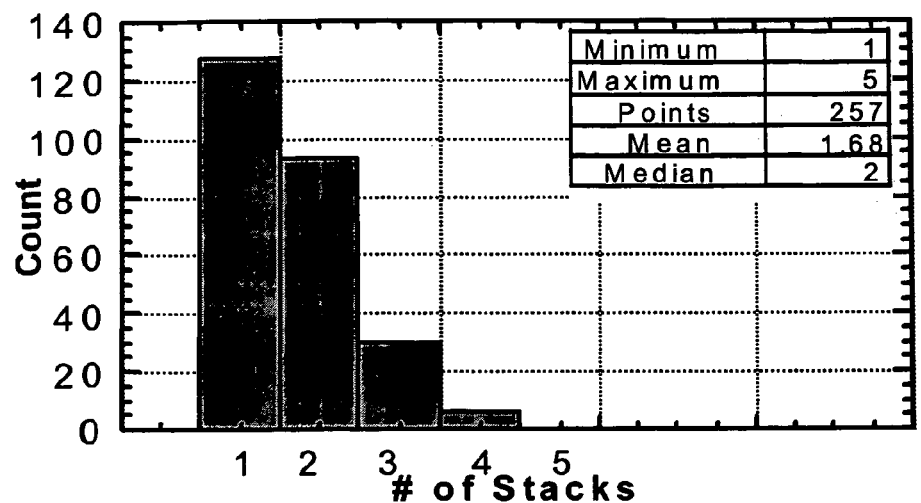
FIG. 7 is a histogram of the $MoS_2$ platelet stacks showing the statistical stack height measurement for the catalyst of Example 5.

A 9.6 grams sample of the material produced in Example 4 above was calcined at 275° C. and impregnated with 9.5 cc of an aqueous solution at about 55° C. containing 2.3 grams of cobalt nitrate and 6.91 grams of arginine (pH 9), such that the molar ratio of arginine to Co was 5/1. The sample was dried at 100° C. for four hours. The sample was then calcined in air at 250° C. for four hours. A portion of the sample is treated in a H$_2$/H$_2$S mixture as described in Example 2 hereof and examined by TEM. FIG. 7 hereof is a histogram of MoS$_2$ platelet stacks for this catalyst sample of this invention which shows a mean stack height of 1.68.

Example 6

Preparation of 6% CoO-24% MoO$_3$ on Silica (Sequential Preparation with Mo Remnant Formed First, Calcining Mo Remnant, and then Impregnated with Arginine in Co Solution.)

Figure 8:
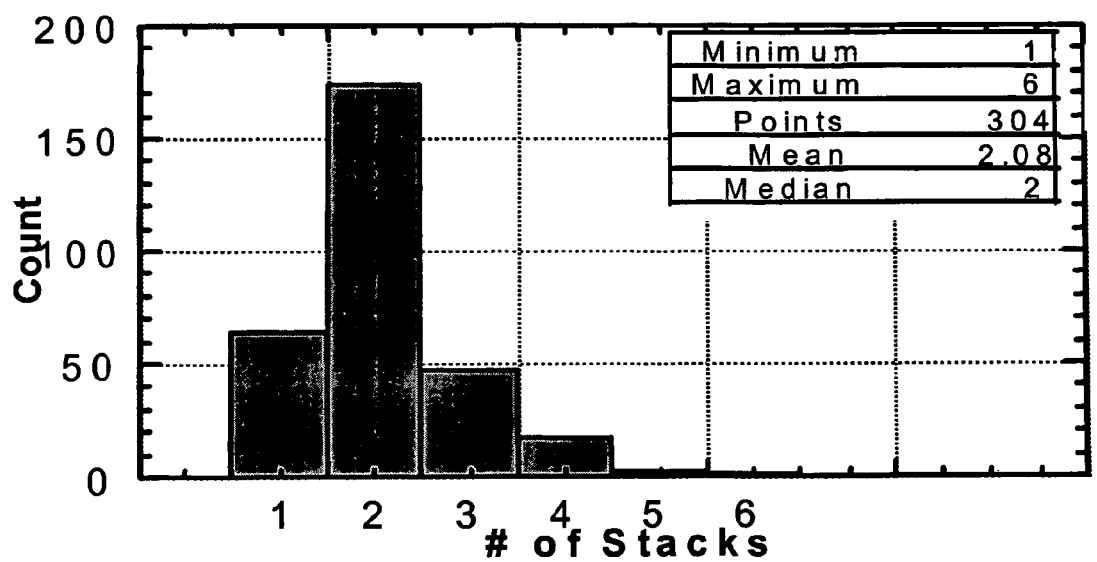
FIG. 8 is a histogram of the $MoS_2$ platelet stacks showing the statistical stack height measurement for the catalyst of Example 6.

A sample analogous to that of Example 5 hereof was prepared except that the Mo remnant formed in step 4 was calcined at 450° C. first to completely oxidize the Mo remnant before the arginine/Co solution was impregnated. The sample was dried at 100° C. for four hours. The sample was then calcined in air at 250° C. for four hours. A portion of the sample was treated in a H$_2$/H$_2$S mixture as described in Example 2 hereof and examined by TEM. FIG. 8 is a histogram of MoS$_2$ platelet stacks for this catalyst. Note that this catalyst sample, which has the Mo formed as a remnant but then oxidized to remove the organic component and with the Co then added to form a remnant, has a stack height that has increased to 2.08.

Example 7

Preparation of 6 wt. % CoO-24 wt. % MoO3 on Silica (Sequential Preparation with Mo Remnant Formed First, then Impregnated with Aqueous Co Solution.)

Figure 9:
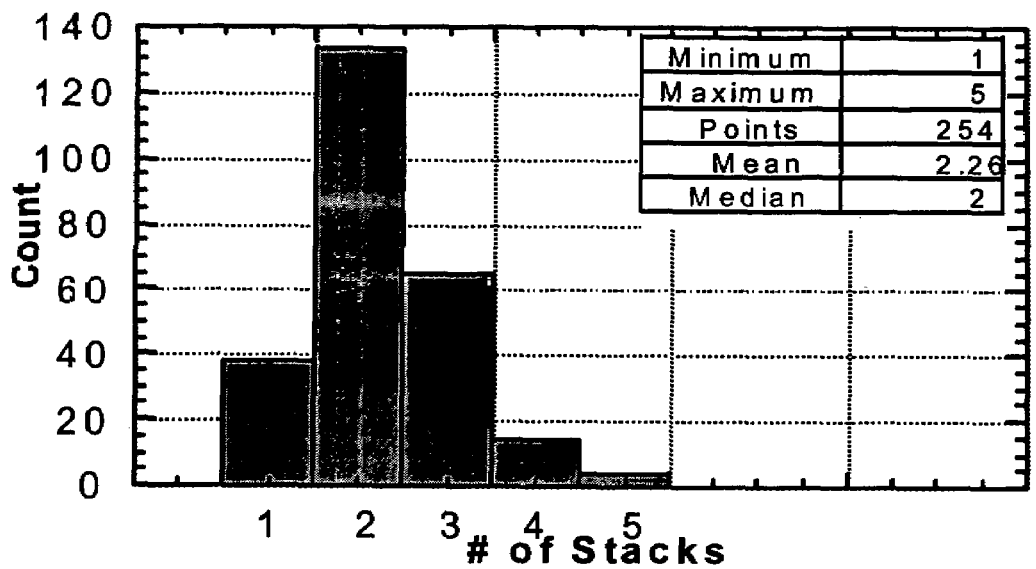
FIG. 9 is a histogram of the $MoS_2$ platelet stacks showing the statistical stack height measurement for the catalyst of Example 7.

A sample analogous to Example 5 hereof was prepared except that in the cobalt nitrate impregnation, the solution was entirely aqueous (no organic addition). This sample was also dried at 100° C. for four hours then calcined at 250° C. for another four hours. A portion of the sample was treated in a H$_2$/H$_2$S mixture as described in Example 2 hereof and examined by TEM. FIG. 9 hereof is a histogram of MoS platelet stacks for this catalyst sample. Note that this catalyst which has the Mo formed as a remnant but the Co added aqueously, has a mean stack height that has increased to 2.26.

C. Co—Mo/SiO$_2$ with Co and Mo Simultaneously Impregnated

Example 8

Preparation of 6 wt. % CoO-24 wt. % MoO$_3$ on Silica (Co-impregnation with Arginine Solution.)

Figure 10:
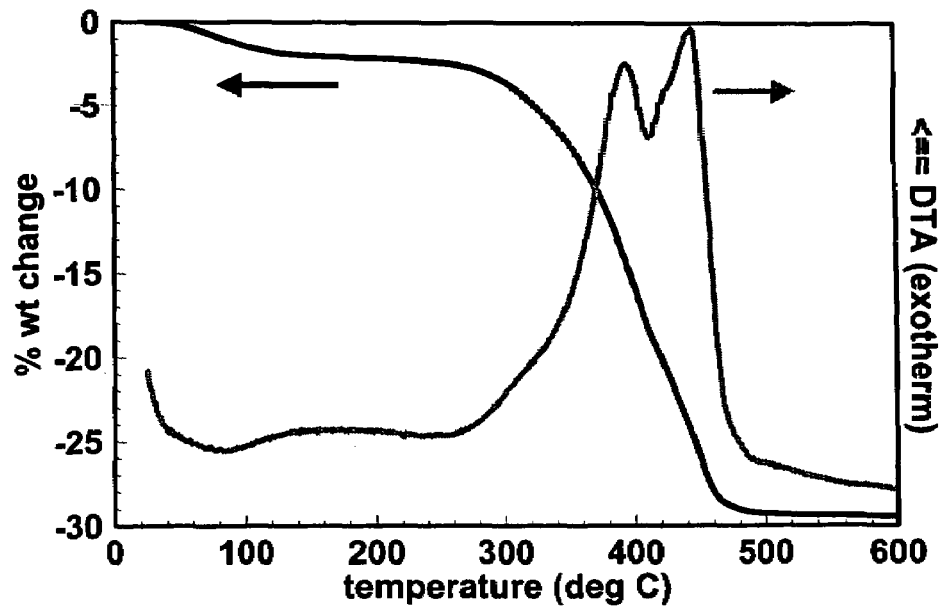
FIG. 10 hereof is the thermal gravimetry/diffential thermal analysis (TG/DTA) plot for the catalyst composition of Example 8.
Figure 11:
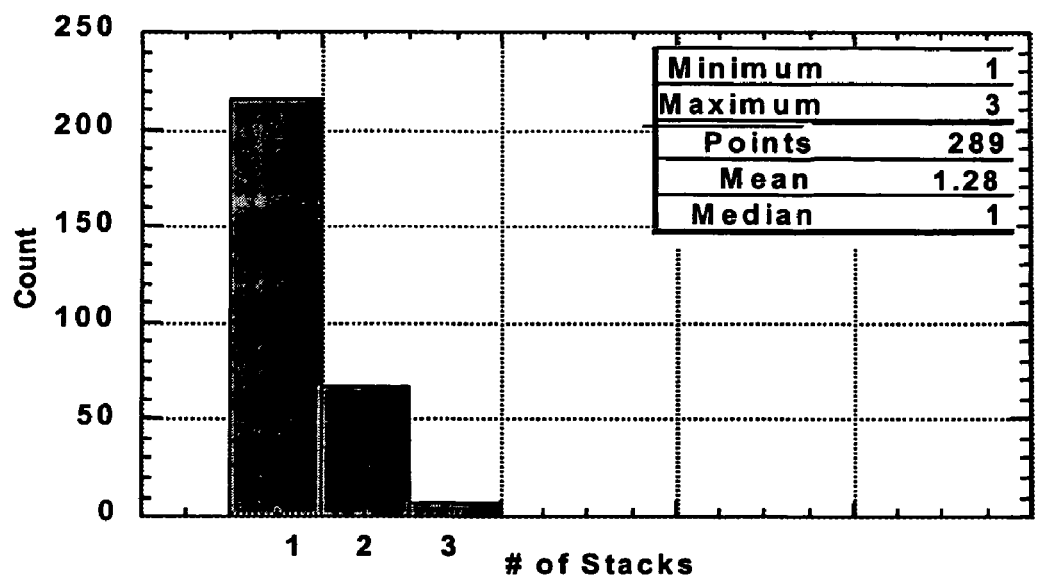
FIG. 11 is a histogram of the $MoS_2$ platelet stacks showing the statistical stack height measurement for the catalyst of Example 8.

23.3 grams of cobalt nitrate, 29.43 grams of ammonium heptamolybdate and 107.1 grams of arginine, along with 15 grams of concentrated ammonium hydroxide solution, were dissolved in water to give a total volume of 150 cc (arginine/(Co+Mo) mole ratio 2.5/1). 80 cc of this solution heated to about 55° C. was impregnated by incipient wetness onto 70 grams of silica and dried at 100° C. for four hours. This sample was calcined at 275° C. for four hours and the remaining 70 cc solution was added in a second incipient wetness impregnation. This was also dried four hours at 100° C. and then calcined at 250° C. for four hours. The remnant that is formed can be observed by decomposition of this sample in air in a TG instrument as shown in FIG. 10 hereof. A portion of the catalyst sample was treated in a H$_2$/H$_2$S mixture as described in Example 2 hereof and examined by TEM. FIG. 11 hereof is a histogram of MoS$_2$ platelet stacks for this catalyst sample. Note that this catalyst which has the both the Co and Mo remnant formed simultaneously and has a low mean stack height of 1.28

Example 9

Preparation of 6% CoO-24% MoO3 on Silica (Co-impregnation with Arginine Solution, Followed by Calcination to Oxidize Remnant.)

Figure 12:
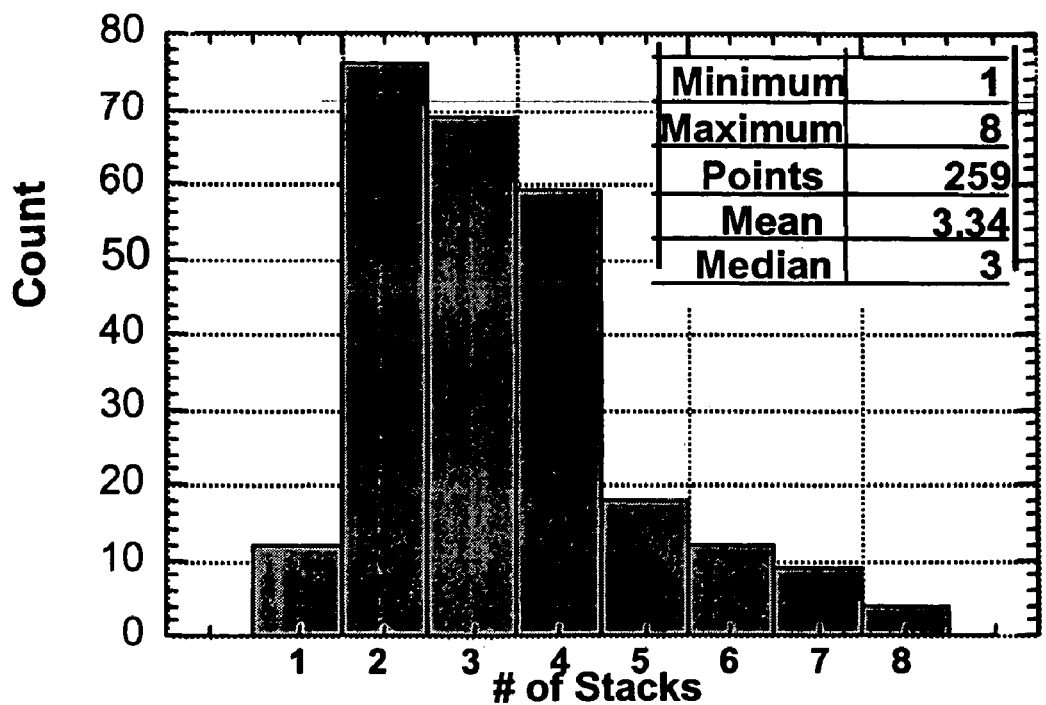
FIG. 12 is a histogram of the MoS$_2$ platelet stacks showing the statistical stack height measurement for the catalyst of Example 9.

A portion of the sample of the 250° C. calcined sample of Example 8 hereof was further calcined at 450° C. for four hours to remove the organic component. A portion of this sample is then treated in a H$_2$/H$_2$S mixture as described in Example 2 hereof and examined by TEM. FIG. 12 hereof is a histogram of MoS$_2$ platelet stacks for this catalyst sample. Note that this catalyst, which has both the Co and Mo remnant formed but then the organic section is oxidatively removed, has a mean high stack height of 3.34.

Example 10

Preparation of 6 wt. % CoO-24 wt. % $MoO_3$ on Silica (Co-impregnation with Arginine Solution of Lower Arginine Content Followed by Calcinations.)

Figure 13:
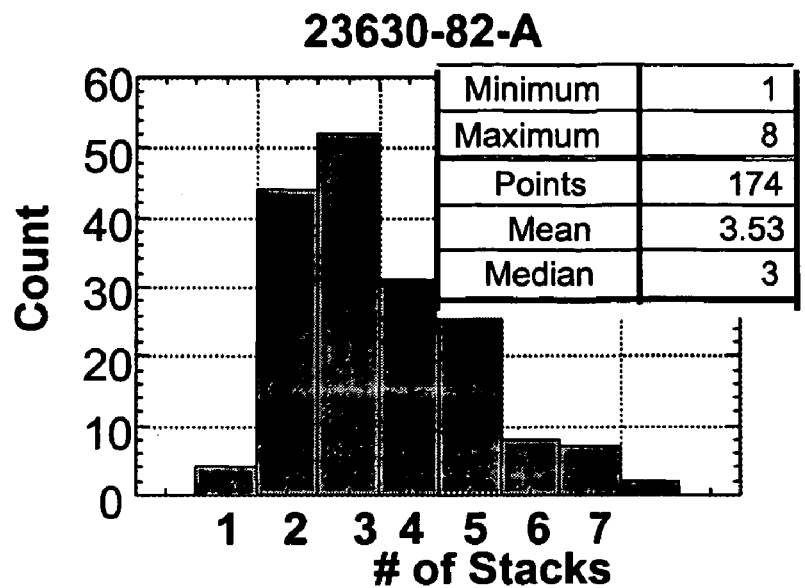
FIG. 13 is a histogram of the MoS$_2$ platelet stacks showing the statistical stack height measurement for the catalyst of Example 10.

4.66 grams of cobalt nitrate, 5.88 grams of ammonium heptamolybdate, 8.59 grams of arginine and 2.5 grams of concentrated ammonium hydroxide were dissolved in water to give a total volume of 17.5 cc (arginine/(Co+Mo) mole ratio 1/1) (final pH 8.9). This entire solution was heated to 55° C. and was impregnated by incipient wetness onto 14 grams of silica and dried at 100° C. for four hours. The sample was then calcined at 450° C. for four hours. A portion of the catalyst sample was treated in a $H_2/H_2S$ mixture as described in Example 2 hereof and examined by TEM. FIG. 13 is a histogram of $MoS_2$ platelet stacks for this catalyst. Note that this catalyst sample which has the organic arginine added in smaller quantity and then has it oxidatively removed also has a mean high stack height of 3.53.

Example 11

Comparative Example

All Aqueous Preparation—Preparation of 6% CoO-24% $MoO_3$ on Silica (Co-impregnation with Aqueous Solution, No Organics Present.)

5.82 grams of cobalt nitrate and 7.36 grams of ammonium heptamolybdate were dissolved in an aqueous solution of 20 cc volume and heated to about 55° C. This solution was impregnated by incipient wetness onto 17.5 grams of silica (pH=3.8). The sample was dried at 100° C. for four hours and then calcined at 400° C. for an additional four hours. A portion of the catalyst was treated in a $H_2/H_2S$ mixture as described in Example 2 hereof and examined by TEM. The mean stack height was found to be 3.75.

Consequently for these samples of Co—Mo/SiO2, all preparations where the preferred amino acids or amino alcohol additives were either not added or were completely calcined gave substantially higher stack heights than those samples where the organics were partially but not totally decomposed.

II. Preparation and Characterization of Co—Mo/$Al_2O_3$ Hydrotreating Catalysts by the Method of this Invention A. Co—Mo/$Al_2O_3$ with Co and Mo Simultaneously Impregnated

Example 12

Preparation of 6% CoO-24% $MoO_3$ Remnant on Alumina (Co-impregnation with Arginine Solution.)

Figure 14:
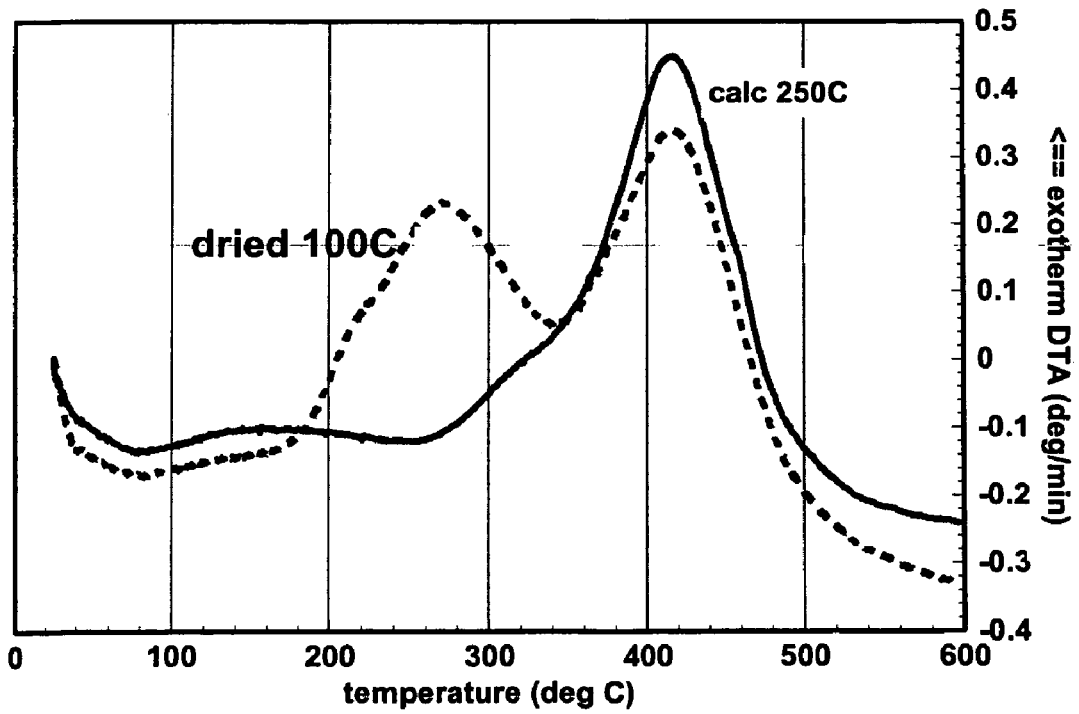
FIG. 14 hereof is the thermal gravimetry/diffential thermal analysis (TG/DTA) plot for the catalyst composition of Example 12.
Figure 15:
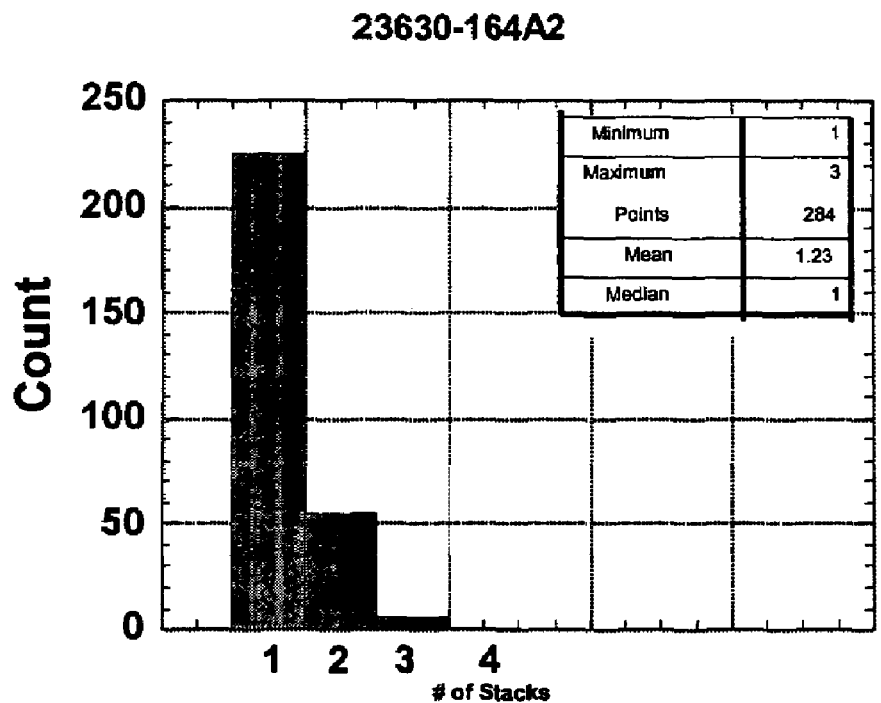
FIG. 15 is a histogram of the MoS$_2$ platelet stacks showing the statistical stack height measurement for the catalyst of Example 12.

5.82 grams of cobalt nitrate, 7.36 grams of ammonium heptamolybdate, 26.8 grams of arginine, and 5 grams of concentrated ammonium hydroxide were dissolved in water and heated to 55° C. to give a total volume of 42 cc [arginine/(Co+Mo) mole ratio 2.5/1]. 22 cc of this solution was impregnated by incipient wetness onto 17.5 grams of alumina and dried at 100° C. for four hours. The sample was calcined at 275° C. for four hours and the remaining 20 cc solution was added in a second incipient wetness impregnation. The sample was also dried four hours at 100° C. and then calcined at 250° C. for four hours. The remnant that is formed can be observed by decomposition of this sample in air in a TG instrument as shown in FIG. 14 hereof, which shows the separate two-step decomposition with the solid line showing how calcination at 250° C. leaves only the second step. A portion of the 250° C. calcined catalyst was treated in a $H_2/H_2S$ mixture as described in Example 2 hereof and examined by TEM. FIG. 15 hereof shows the low mean stack height of 1.23 for this catalyst sample.

Example 13

Preparation of 6 wt. % CoO-24 wt. % $MoO_3$ on Alumina (Co-impregnation with Arginine Solution, Followed by Calcination to Oxidize Remnant.)

Figure 16:
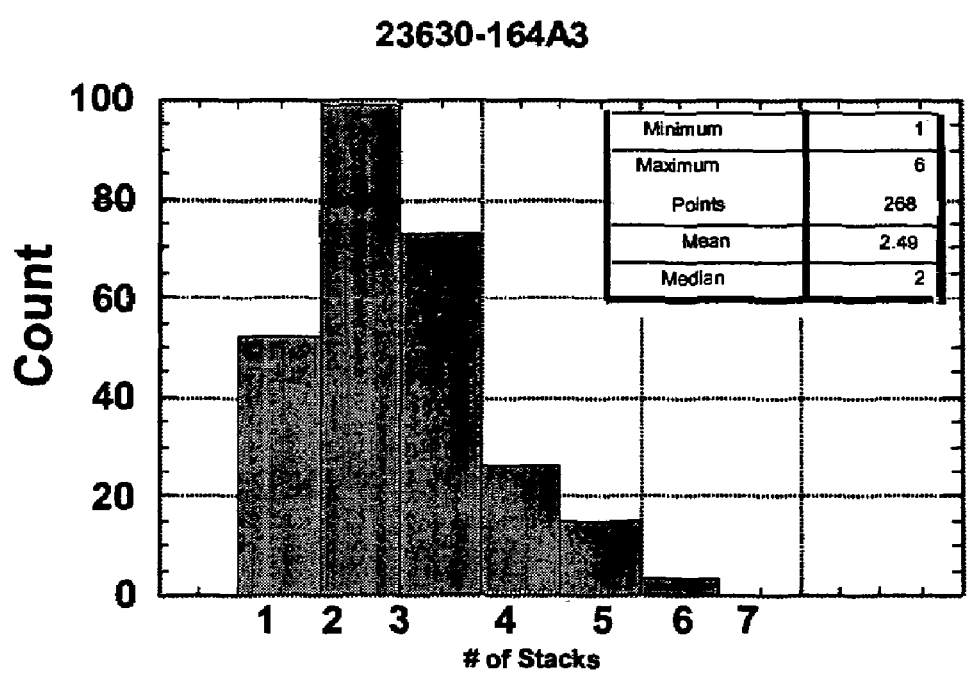
FIG. 16 is a histogram of the MoS$_2$ platelet stacks showing the statistical stack height measurement for the catalyst of Example 13.

A portion of the sample of the 250° C. calcined sample of Example 12 hereof was further calcined at 400° C. for four hours to remove the organic component. A portion of this sample was then treated in a $H_2/H_2S$ mixture as described in Example 2 hereof and examined by TEM. FIG. 16 hereof shows the results that with calcination the mean stack height increases dramatically to 2.49.

III. Preparation and Characterization of Co—Mo-W/$SiO_2$ Hydrotreating Catalysts by the Method of this Invention A. Ni—Mo—W/$SiO_2$ with Ni, Mo and W Simultaneously Impregnated

Example 14

Preparation of 6 wt. % NiO-12 wt. % $MoO_3$-19.3 wt. % $WO_3$ on Silica (Co-impregnation with Arginine Solution.)

Figure 17:
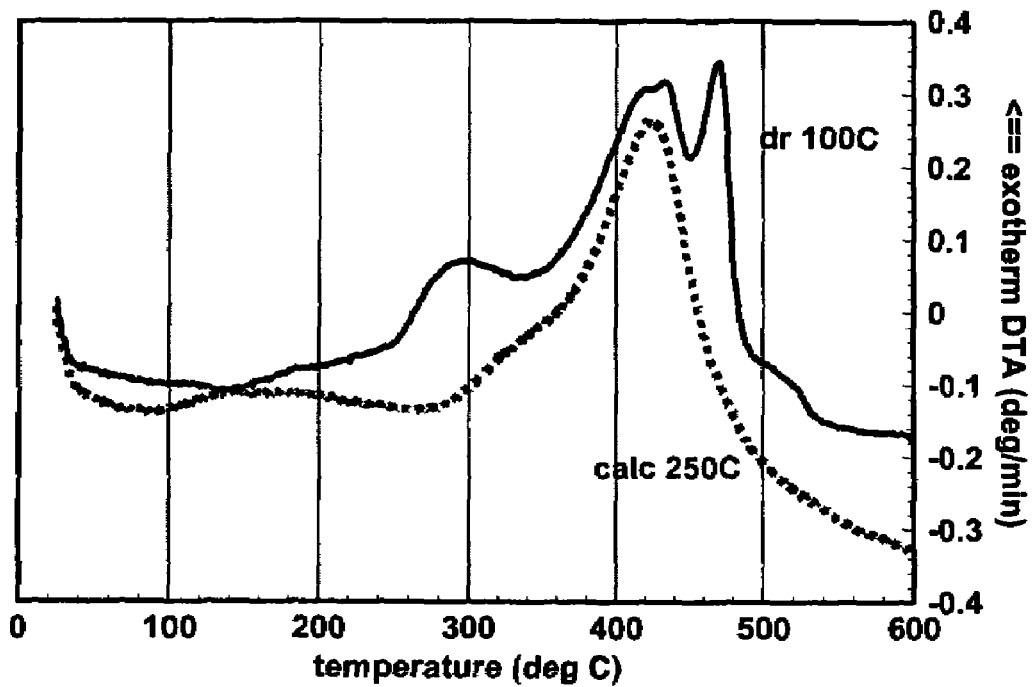
FIG. 17 hereof is the thermal gravimetry/diffential thermal analysis (TG/DTA) plot for the catalyst composition of Example 14.
Figure 18:
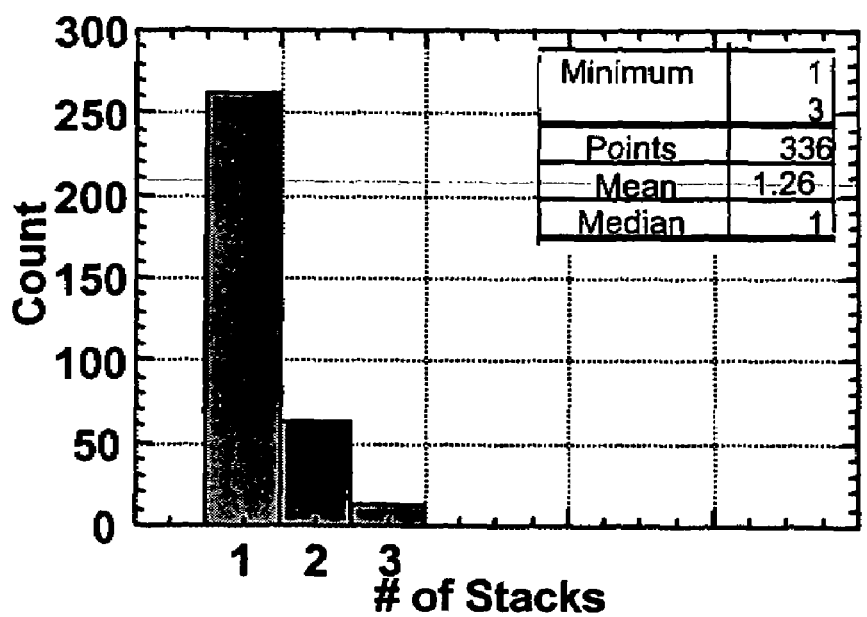
FIG. 18 is a histogram of the MoS$_2$ platelet stacks showing the statistical stack height measurement for the catalyst of Example 14.

23.3 grams of nickel nitrate, 14.65 grams of ammonium heptamolybdate, 20.45 grams of ammonium metatungstate (all from Aldrich), 83.6 grams of arginine (all from Aldrich) and 40 grams of ammonium hydroxide were dissolved in water heated to 55° C. to give a total volume of 150 cc [arginine/(Ni+Mo+W) mole ratio about 2/1]. 75 cc of this solution was impregnated onto 62.7 grams of silica and dried at 100° C. for four hours. This sample was calcined at 275° C. for four hours and the remaining 40 cc solution was added in a second impregnation. This was also dried four hours at 100° C. and then calcined at 250° C. for four hours. The remnant that was formed can be observed by decomposition of this sample in air in a TG instrument as shown in FIG. 17 hereof. A portion of the catalyst is treated in a $H_2/H_2S$ mixture as described in Example 2 hereof and examined by TEM. FIG. 18 hereof shows that this catalyst, which has Ni, Mo and W remnant formed simultaneously has a low mean stack height of 1.26.

Example 15

Preparation of 6 wt. % NiO-12 wt. % $MoO_3$-19.3 wt. % $WO_3$ on Silica (Co-impregnation with Arginine Solution, Followed by Calcination to Oxidize Remnant.)

Figure 19:
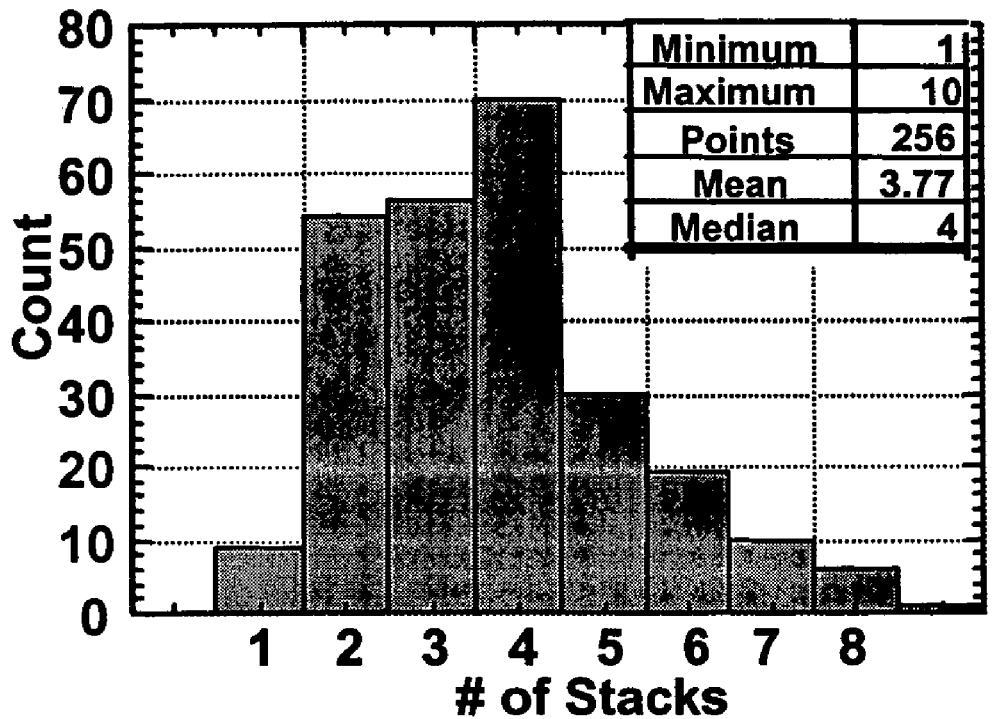
FIG. 19 is a histogram of the MoS$_2$ platelet stacks showing the statistical stack height measurement for the catalyst of Example 15.

A portion of the sample of the 250° C. calcined sample of Example 14 hereof was further calcined at 475° C. for four hours to remove the organic component. A portion of this sample was then treated in a $H_2/H_2S$ mixture as described in Example 2 hereof and examined by TEM. FIG. 19 shows the results that this catalyst which has Ni, Mo and W remnant formed simultaneously but then is oxidized to remove the organic component has a high mean stack height of 3.77. Again, in all cases where the amino acids or amino alcohol complex is totally calcined to remove the organic, the stack heights are substantially higher.

Example 16

Figure 20:
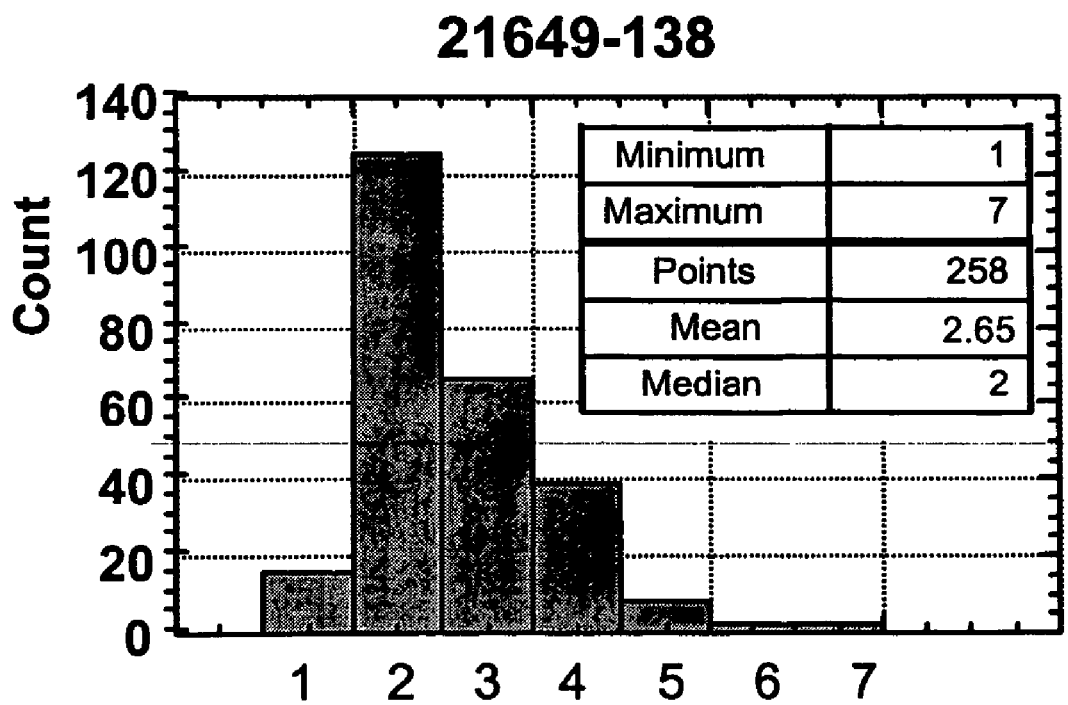
FIG. 20 is a histogram of the MoS$_2$ platelet stacks showing the statistical stack height measurement for the catalyst of Example 16.

Comparative Example—Preparation of 5% NiO, 10% $MoO_3$ and 16% $WO_3$ on Alumina Using Organic Acids not Part of this Invention To 35 cc of water, which was heated to approximately 60° C., 12.8 grams (0.067 moles) of citric acid are added and dissolved. 7.94 grams of nickel carbonate (corresponding to approximately 5 grams of NiO or 0.067 mole Ni) was added slowly to the 60° C. solution above to form a green solution. To this solution, 12.27 grams of ammonium heptamolybdate (0.069 moles Mo or equivalent to 10 grams of MoO3) and 17.0 grams of ammonium metatungstate (0.069 moles W or equivalent to 16 g of WO3.) was added. Additional water was added to bring the volume of the solution to 55 cc. 69 grams of alumina extrudates with a pore volume of 0.8 cc/g was impregnated in a single step with the Ni—Mo—W citric acid solution. The sample was then dried at 120° C. overnight. A portion of this sample was then treated in a $H_2/H_2S$ mixture as described in Example 2 hereof and examined by TEM. FIG. 20 hereof shows the results of a stack height of 2.65.

Example 17

Comparative Example—Calcined Version of Catalyst of Example 16 Hereof

Figure 21:
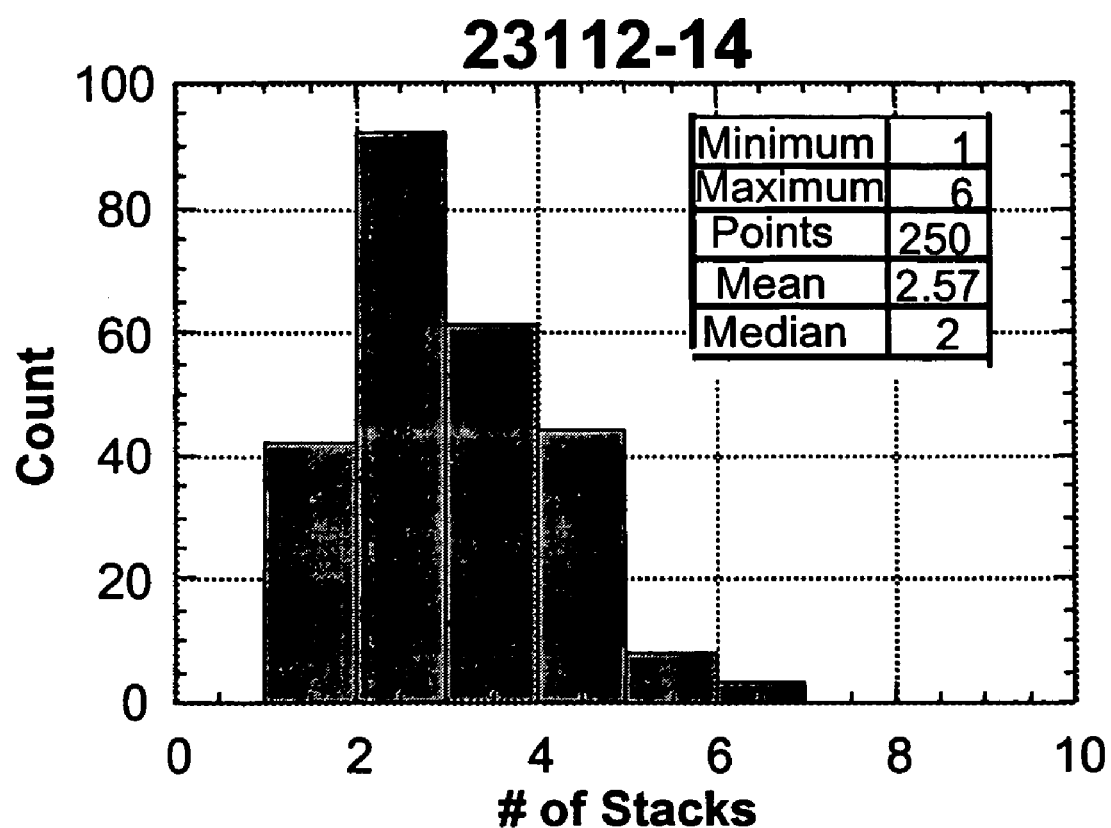
FIG. 21 is a histogram of the MoS$_2$ platelet stacks showing the statistical stack height measurement for the catalyst of Example 17.

The impregnated sample of example 16 dried at 120° C. overnight was further calcined at 400° C. for four hours to oxidize any organic component. A portion of this sample was then treated in a $H_2/H_2S$ mixture as described in Example 2 hereof and examined by TEM. FIG. 21 hereof shows the results that this catalyst (stack height 2.57), which has Ni,Mo and W Co-impregnated by use of an organic acid outside the scope of this invention does not produce a significantly different stacking arrangement if the organic remains in the sample or is first removed by calcination. In both cases, the mean stack height is about 2.6 stacks. This is in stark contrast to the catalysts of the invention where inclusion of the organic remnant creates a catalyst with substantially lower stack height.

What is claimed is:

1. A method for preparing a sulfided catalyst composition, which method comprises: (a) impregnating an inorganic catalyst support with an aqueous solution containing (i) a salt of a Group VIII metal selected from Co and Ni, (ii) a salt of a Group VI metal selected from Mo and W, and (iii) an effective amount of an organic agent selected from amino alcohols and amino acids; (b) drying said impregnated catalyst support to remove substantially all water, thereby resulting in a metal-organic component on support catalyst precursor; (c) heating said substantially dried catalyst precursor in a heating step wherein the temperature is increased to above 200° C. but to less than about 325° C., in an oxygen-containing atmosphere wherein about 20 wt. % to about 80 wt. % of the organic portion is oxidized; (d) sulfiding said partially oxidized catalyst precursor at sulfiding conditions in the presence of a sulfiding agent, thereby resulting in a sulfided catalyst composition.

2. The method of claim 1 wherein the Group VIII metal is Co.

3. The method of claim 2 wherein the Group VI metal is Mo.

4. The method of claim 1 wherein the organic agent is an amino alcohol.

5. The method of claim 4 wherein the amino alcohol is selected from the mon-, di-, and tri-, substituted aliphatic hydroxyalkylamines.

6. The method of claim 5 wherein the amino alcohol is selected from the group consisting of methanolamifle, di-methanolamine, tri-methanolamine, ethanolamine, di-ethanolamine, tri-ethanolamine, butanolamine, di-butanolamine, tri-butanolamine, propanolamine, di-propanaolamnine, tri-propanolamine, N,N,-dialkyl-ethanolamines, N-alkyl-di-ethanolamines, N-alkyl-ethanolamines, N,N ,-dialkyl-propanolamines, N-alkyl-dipropanolamines, N-alkyl-propanolamines, N,N,-dialkyl-propanolamines, N-alkyl-dipropanolamines, N-alkyl-propanolamines N,N,-dialkyl-propanolamines, N-alkyl -dipropanolamines, N-alkyl-propanolamines, N,N,-dialkyl-butonolamines, N-alkyl-dibutanolamines, N-alkyl-butanolamines, N,N,-dialkyl-butanolamines, N-alkyl-dibutanolamines, N-alkyl-butanolamines, N,N,-dialkyl-hexanolamines, N-alkyl-dihexanolamines, N-alkyl-hexanolamines, N,N ,-dialkyl-hexanolamines, N-alkyl-dihexanolamines, N-alkyl-hexanolamines, N,N,-dialkyl-heptanolamines, N-alkyl -diheptanolamines, N-alkyl heptanolamines, N,N ,-dialkyl-heptanolamines, N-alkyl-diheptanolamines, N-alkyl-heptanolamines.

7. The method of claim 6 wherein the amino alcohol is triethanolamine.

8. The method of claim 6 wherein the N-alkyl group is a hydrocarbon or substituted hydrocarbon group containing from 1 to 50 carbon atoms.

9. The method of claim 8 wherein the hydrocarbon group is selected from the group consisting of methyl, ethyl, n-propyl, isopropyl, n-butyl, isobutyl, n-pentyl, isopentyl, n-hexyl, and isohexyl.

10. The method of claim 1 wherein the organic agent is an amino acid.

11. The method of claim 10 wherein the amino avid is selected from the group consisting of alanine, arginine, asparagines, aspartic acid, cysteine, cystine, 3,5-dibromotyrosine, 3,5, diiodotyrosine, glutanile acid, glutamine, glycinc, histidine, hydroxylysiflo hydroxyproline, isoleucine, leucine, lysine, methionine, phenylalanine, proline, serine, threonine, thyroxine, tryptophane, tyrosile and valine.

12. The method of claim 11 wherein the amino acid is arginine.

13. The method of claim 1 wherein the sulfiding agent is a mixture of $H_2S$ and $H_2$ and the sulfiding temperatures range from about 360° C. to about 400° C.

14. The method of claim 1 wherein said inorganic support is selected from the group consisting of silica, alumina, silica-alumina, titania, and zirconia.

15. The method of claim 14 wherein said inorganic support is selected from silica and alumina.

16. The method of claim 1, wherein the heating step increases the temperature to about 250° C. to about 325° C.

17. The method of claim 1, wherein the aqueous solution has a basic pH.

* * * * *